(12) United States Patent  
Charytoniuk et al.

(10) Patent No.: US 9,098,174 B1  
(45) Date of Patent: Aug. 4, 2015

(54) EXPANDING THE FUNCTIONALITY OF THE BROWSER URL BOX

(71) Applicant: Google Inc., Mountain View, CA (US)

(72) Inventors: Tomasz Charytoniuk, San Francisco, CA (US); Doug Sherrets, San Francisco, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 13/622,678

(22) Filed: Sep. 19, 2012

(51) Int. Cl.  
*G06F 3/00* (2006.01)  
*G06F 3/0484* (2013.01)

(52) U.S. Cl.  
CPC .................................... *G06F 3/0484* (2013.01)

(58) Field of Classification Search  
CPC ............ G06F 17/30864; G06F 3/0481; G06F 3/0489; G06F 17/30696; G06F 17/30867; G06F 17/30887; G06F 17/30861; G06F 3/14; G06F 3/0484  
USPC .......................................................... 715/760  
See application file for complete search history.

(56) References Cited

U.S. PATENT DOCUMENTS

| | | | | |
|---|---|---|---|---|
| 2009/0094196 | A1* | 4/2009 | Piwowarski et al. | 707/3 |
| 2011/0252060 | A1* | 10/2011 | Broman et al. | 707/771 |
| 2012/0191728 | A1* | 7/2012 | Libin et al. | 707/748 |
| 2012/0254775 | A1* | 10/2012 | Hsieh et al. | 715/760 |
| 2013/0031457 | A1* | 1/2013 | Griffiths et al. | 715/231 |
| 2014/0047359 | A1* | 2/2014 | Teigene et al. | 715/760 |

* cited by examiner

*Primary Examiner* — Kieu Vu  
*Assistant Examiner* — Andrew Chung  
(74) *Attorney, Agent, or Firm* — Sterne, Kessler, Goldstein & Fox P.L.L.C.

(57) ABSTRACT

Systems and methods for expanding the functionality of a browser URL input box are provided. A first input is received from a navigation field at a browser. An input type of the first input is determined. A plurality of repositories are searched for one or more browser extensions based on the input type. A set of browser extension results are displayed within the navigation field based on a confidence score associated with each repository of the plurality of repositories. The confidence score indicates a probability of a user's intent to use a browser extension included in the browser extension results.

29 Claims, 6 Drawing Sheets

EXPANDING THE FUNCTIONALITY OF THE BROWSER URL BOX

BACKGROUND

1. Field

Embodiments are generally related to an application or service that expands the functionality of the navigation field of a browser.

2. Related

The navigation field of a browser is generally used to generate a URL request or a search query. Typically, within the navigation field, a user enters the name of a website that they would like to display. In response, a request message is generated and sent to a server storing the contents of the website. The server sends back a response message which includes the contents of the website. Upon receipt of the response message, the browser reads the contents of the response message and formats the content of the website for display. Alternatively, a user may enter a string of text for which they would like a set of search results returned. In response, a list of suggested URLs may be displayed. The user may select one of the suggested URLs which will result in the display of a website.

BRIEF SUMMARY

Embodiments described herein relate to methods and systems for expanding the functionality of a navigation field of a browser. A first input is received from a navigation field of a browser. An input type of the first input is determined. A plurality of repositories are searched for one or more browser extensions based on the input type. A set of browser extension results are displayed within the navigation field based on a confidence score associated with each repository of the plurality of repositories. The confidence score indicates a probability of a user's intent to use a browser extension included in the browser extension results.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
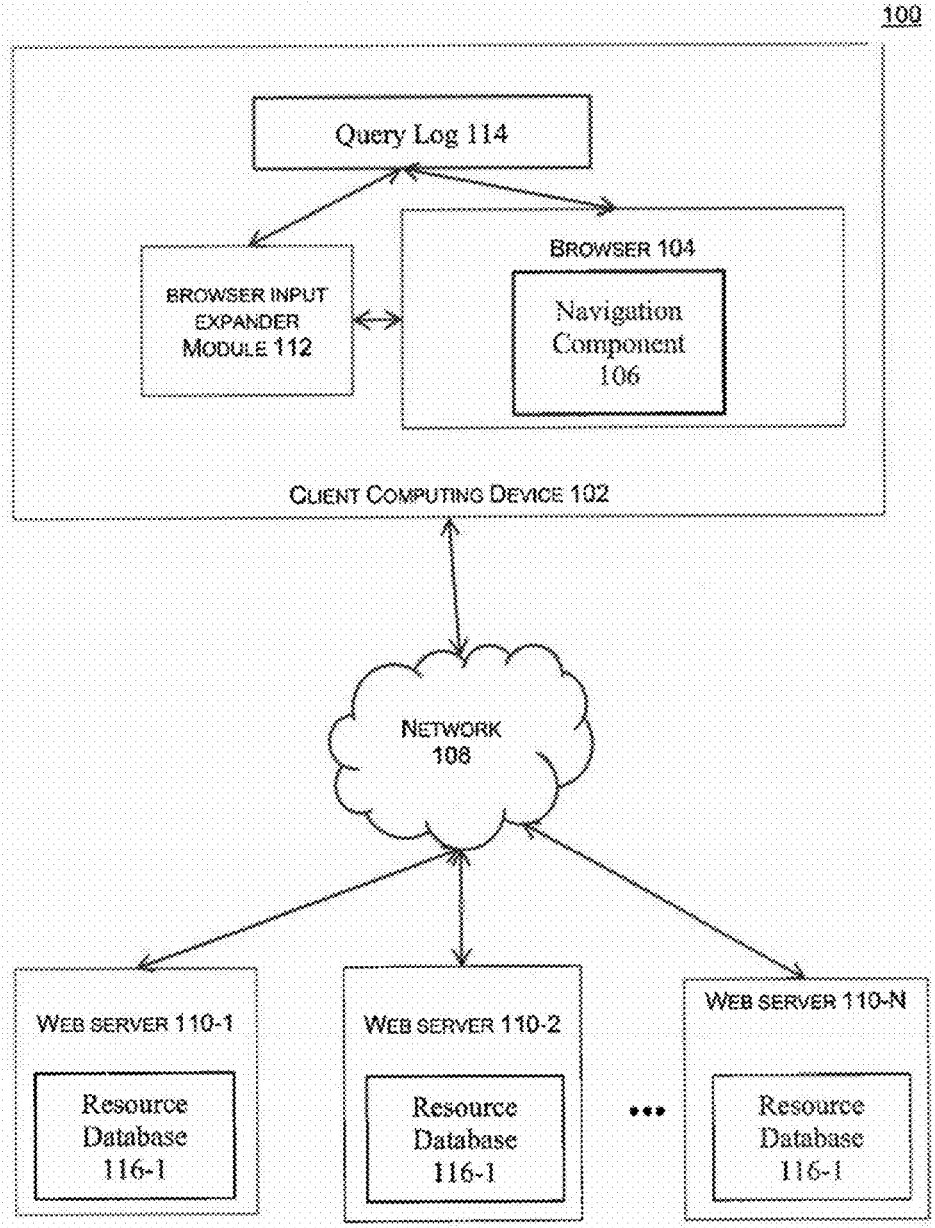
FIG. 1 is a diagram illustrating an example system, according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the navigation field of a browser is useful for performing the functionality discussed above, users could benefit from increased functionality of the navigation field. For example, in order to perform different tasks, such as updating a web-based calendar or updating a social networking profile, a user typically has to navigate to the specific website and perform these tasks. This normally requires the user to open additional browser tabs or browser windows in order to navigate to different websites. A system is provided that allows a user to perform tasks other than search queries or URL requests from a navigation field of browser. Such a system allows a user to efficiently interact with a website without having to navigate to the website.

Such a system or application, as described herein, allows its users to expand the functionality of the navigation field of a browser. In an example use of such an application, a user may begin to enter a first input in the navigation field of the browser. The first input can be a string of text or characters. In response, the browser is configured to determine an input type of the first input. The browser can first determine, for example, whether the input type is related to a general URL request or search query.

In an example, the user does not intend to generate a URL request or search query. Rather, the user may want to launch a browser extension which can add the first input entered within the navigation field to a status section of their profile on a social networking website along with a link to the page they are viewing.

A browser extension is an application that extends a functionality of a browser by, for example, adding a user interface for a particular resource or website. Browser extensions are also known as "browser plug-ins" or "browser add-ons." Additional features can be added to web browsers using browser extensions. Generally, browser extensions are treated as client-side software installed on the local browser. Example browser extensions may include extensions for resources that provide an online dictionary, online photo-sharing sites, online email, and online translator on a client computing device. Browser extensions may be downloaded from a web server or an application server and installed on a client computing device as part of the browser. While embodiments will be described with respect to browser extensions, one of ordinary skill in the art will recognize that alternatives such as web-based applications may be used in conjunction with the system. Such web-based applications may be incorporated into the system through use of an application programming interface (API).

When the first input type is determined not to be a URL request or search query, a plurality of repositories are searched for one or more browser extensions based on the first input type. For example, the browser may determine that the first input is a predefined keyword trigger. The predefined keyword trigger can be a series of characters that have been associated with a browser extension. When the series of characters are at the beginning of the first input, the browser is configured to launch the associated browser extension. In the example above, an application related to the social networking website may be associated with a keyword trigger. The application may provide the user the ability to update the status section of their social networking profile without having to navigate to the actual social networking website.

In response to identifying the first input as a keyword trigger, the browser can search the plurality of repositories for applications associated with keyword triggers, according to an embodiment. According to an embodiment, the searching of the plurality of repositories is triggered by a user pressing one or more shortcut keys of an input device before or after entering the first input in the input field. For example, a user may press one or more keys, such as an "alt" key, "command" key, or "option" key along with any other key of an input device which will trigger a search of the plurality of repositories. The one or more short cut keys may be pre-configured by a user or a developer of a browser extension, according to an embodiment.

In another embodiment, the plurality of repositories can be searched during the receipt of the first input. In this way, the identification of the first input and the searching of a plurality of repositories can occur with minimal user instruction. A plurality of repositories may reside on the client computing device running the browser. Each of the repositories includes a set of browser extensions with common characteristics. For example, one of the repositories may be a keyword trigger repository. The keyword trigger repository can include all of the browser extensions installed on the client computing device which are associated with a keyword trigger. A set of browser extension results is displayed based on a confidence score associated with each extension within a repository. The set of browser extension results includes names or labels associated with browser extensions retrieved from the plurality of searched repositories. The confidence score is a value which indicates a probability of a user's intent to use a browser extension included in the browser extension results. The browser extension results are a suggested list of browser extensions based on the first input.

In this example, the browser extension associated with the social networking website can be assigned a confidence score in the range of 0.9 and 1.0 and can be displayed near or at the top of the suggested browser extension results. Such a confidence score indicates a 90% to 100% probability that the user intends to use the browser extension associated with the social networking website. Confidence score generation will be described in further detail below. Once the first input is completely entered, the user may select one of the suggested browser extensions from the browser extensions results. For example, the user may select the social networking website browser extension. In response, an instance of the browser extension is launched and the string of text entered as the first input is sent to the browser extension. The browser extension then sends the first input to the social networking profile of the user in order to update the status portion. In this way, a user is able to perform functions other than URL requests or search queries using the navigation field of a browser. Additionally, a user is provided the ability to interact with websites without navigating to the website.

It is noted that the embodiments are not limited to this example application, but are instead applicable to other applications as would be apparent to persons skilled in the art based on the teachings provided herein. Those skilled in the art with access to the teachings provided herein will recognize additional modifications, applications, and embodiments within the scope thereof and additional fields in which the embodiments would be of significant utility. For example, an individual may launch other browser extensions or may have the first input entered into a navigation field of a browser sent to other kinds of websites. Additionally, the input may be fed into an application programming interface which may process the input and perform many different kinds of actions, such as updating a calendar, creating tasks, or creating notes.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

FIG. 1 is a block diagram illustrating a browser navigation expansion system 100 for providing expanded functionality of a browser navigation field of a browser. Browser navigation expansion system 100 includes a client computing device 102 and one or more web servers 110-1, 110-2 . . . 110-N, N being a positive integer. Client computing device 102 and the one or more web servers 110-1, 110-2 . . . 110-N are coupled via one or more networks 108, such as the Internet or a local area network. Client computing device 102 includes a browser 104, a browser input expander module 112, and a query log 114. Browser 104 includes a navigation component 106.

Client computing device 102 can include one or more browser extensions. A browser extension is a program downloaded by a user or installed by a developer on client computing device 102. As discussed previously, a browser extension is a program that expands the functionality of browser 104. In an embodiment, each browser extension is associated with an external website or program. For example, a user may install a social networking or task scheduling browser extension on client computing device 102. The social networking browser extension can be used to interact with a social networking website or program stored on one of web servers 110-1, 110-2 . . . 110-N, while the task scheduling browser extension can be used to interact with a task scheduling website or program also stored on one of web servers 110-1, 110-2 . . . 10-N. When a user utilizes one of the browser extensions on client computing device 102, the user can send information to the associated external website or program. For example, a user may update a social networking profile on the social networking website or add a task to a calendar on the task scheduling website.

In general, browser navigation expansion system 100 operates as follows. A first input is received via navigation component 106. Navigation component 106 can be an omnibox, in an embodiment. An omnibox is a user interface element in a web browser. The omnibox receives input from a user and allows a user to navigate the World Wide Web (or simply the "Web"). According to an embodiment, navigation component 106 is embedded into browser 104. In another embodiment, navigation component 106 is downloaded from one of web servers 110-1, 110-2 . . . 110-N and installed as a plug-in to browser 104. Once installed as a plug-in on browser 104, navigation component 106 has access to the hardware and software resources available to browser 104 on client computing device 102. In another embodiment, navigation component 106 is a browser extension that is downloaded and/or installed on browser 104.

The first input received via navigation component 106 may be generated in response to a user entering a string of characters. Browser input expander module 112 is configured to determine an input type of the first input. According to an embodiment, browser input expander module 112 parses the string of characters associated with the first input and determines if the parsed data is related to a search query. In an example, a search query is one in which a user intends to generate a Uniform Resource Locator ("URL") request or perform a web search using the first input as one or more keywords. A URL request will fetch the contents associated with a webpage from web servers 110-1, 110-2 ... 110-N and display the web page within a display area of browser 104. A web search takes the first input and performs a search of the Web for URLs related to web pages that include information related to the first input. In an example, a user enters a search query into navigation component 106, and in response receives a list of URL entries, each URL associated with a path to a webpage. In another example, in response to a user entering or beginning to enter a URL entry, navigation module 106 presents a user with a drop-down menu that includes a listing of URL entries that were previously entered into the navigation component 106 or accessed by the user.

Browser input expander module 112 determines whether the first input is related to a search query by analyzing the first input and comparing it to known search query characteristics. For example, if the parsed first input includes a domain protocol such as "http" or a server name such as "website.com", this can be an indication that the first input type is a search query. In another example, the parsed first input may be compared with previous entries that were entered in the navigation component 106. If the first input matches a particular string of characters that were previously generated by the user in order to perform a search or website retrieval, this is an indication that the first input is related to a search query. In yet another example, the first input may be compared with a list of URLs either cached at client computing device 102 or saved in a Favorites section of browser 104. If a match is determined, this is also an indication that the first input type is a search query. In all of the above examples, if the first input type is determined to be a search query, navigation component 106 is configured to perform standard operations such as requesting contents of a URL or retrieving a list of search results for display.

When the parsed first input is determined not to be related to a search query, browser input expander module 112 is configured to identify a query type of the first input, according to an embodiment. In an embodiment, a query type of the first input is a keyword trigger. A keyword trigger is a string of characters that have been assigned to a particular browser extension. For example, a developer of a browser extension utilizing system 100 can assign a keyword trigger to the browser extension utilizing an application programming interface (API). An application programming interface (API) is a specification intended to be used as an interface by software components to communicate with each other. An API may include specifications for routines, data structures, object classes, and variables that can all be used to allow communication between navigation component 106 and a browser extension. In an embodiment, exchange of data between navigation component 106 and a browser extension is enabled via a browser-supported API. For example, a developer would utilize a browser-supported API to assign a keyword trigger to a browser extension. When a user enters the keyword trigger into navigation component 106, this can be an indication that the user intends to use the browser extension. For example, a developer may develop a social networking browser extension, as described previously. The developer may assign the string of characters "snw:/" as a keyword trigger for the social networking browser extension. Thus, when a user provides as first input "snw:/" followed by an additional string of characters, this can be an indication that the user wants to use the social networking browser extension. Browser input expander module 112 is configured to identify the query type as a keyword trigger and any text entered after the keyword trigger can be passed to the social networking application, once the user completes entry of the first input.

In another embodiment, a query type of the first input is a regular expression trigger. A regular expression trigger is a series of characters entered by the user indicating that the user does not intend to generate a URL request. For example, the parsed first input can be analyzed and if the string of characters entered by the user does not include a domain protocol or sever name, then the first input can be designated as a regular expression trigger. Additionally, browser input expander module 112 is configured to keep a query log 114 of all entries made via navigation component 106 that are not search queries. The first input may be compared with the log entries of query log 114 to determine whether the first input matches any of the log entries. If the first input matches any entries of query log 114, then the first input is designated as a regular expression trigger.

In another example, the first input may be compared to a log of browser extensions stored on client computing device 102. For example, a user may download and install a plurality of browser extensions on client computing device 102. As a browser extension is either installed or executed at client computing device 102, browser 104 can maintain a log of available browser extensions on client computing device 102 (not illustrated). The log of all available browser extensions can include a name, category, and a list of words related to each browser extension installed on client computing device 102. For example, the social networking browser extension discussed above may have its category designated as social networking and/or entertainment. Additionally, the social networking application may be associated with words such as the acronym "LOL". The acronym "LOL" is often used in communication in a social networking website. The words related to the browser extensions can be updated in the log based on user interaction with the application. For example, browser input expander module 112 can monitor the usage of each application via navigation component 106 and determine which words are frequently used in conjunction with a particular browser extension. Frequently used words or phrases may be stored in the log of available browser extensions and associated with the browser extension.

When a user enters a regular expression trigger as a first input, browser input expander module 112 is configured to determine whether the string of characters is related to one of the browser extensions in the log of browser extensions, according to an embodiment. For example, if the user enters the string of characters "LOL", as part of the first input, this can be an indication that the user intends to use the social networking browser extension, discussed above.

According to an embodiment, browser input expander module 112 is configured to search a plurality of repositories for one or more browser extensions based on the input type. A repository is a collection of browser extensions that are grouped together based on similarities between the browser extensions. For example, a repository of browser extensions can be grouped based on, among other things, the category of the browser extension, frequency of use by a user, or how the browser extension is utilized by a user. The search of the plurality of repositories is based on a model. According to an embodiment, a model determines a confidence score associated with a probability that a user intends to use a browser extension from a repository when the user provides a first input. Based on the model, a confidence score for each extension within the plurality of repositories is determined and browser extensions are retrieved for display within navigation component 106 based on the confidence score. A standard machine learning or statistical technique may be used to generate a confidence score or the probability that a user intends to a use a browser extension from a repository. Generation of the model and confidence scores are discussed in greater detail below.

According to an embodiment, browser input expander module 112 is configured to generate a model based on a set of criteria. Criteria are generated for a model based on at least one of the following: (i) information related to user activity of the browser extensions, (ii) information related to the first input, and (iii) information related to the plurality of repositories. The model assigns a confidence score for each extension within a repository, according to an embodiment.

Model Generation

Query log 114 can include one or more logical or physical memory devices that are configured to store data associated with prior non-search query related inputs by a user within navigation component 106. For example, query log 114 can include data such as user activity or user information, information related to the first input, and information related to the repositories. Browser input expander module 112 uses the information within query log 114 as criteria to generate a model. Once generated, browser input expander module 112 configures the model to learn from the information within query log 114. In this way, browser input expander module 112 can provide the user with a set of browser extension results that have the highest probability of being used by the user. In an example, the model may determine the probability of a user's intent to use a browser extension within a particular repository when the user provides a certain first input.

Criteria for Model: (U, F, R)—User Activity, First Input, and Browser Repositories Browser input expander module 112 is configured to monitor user activity of all browser extensions installed on client computing device 102 in order to create criteria for the model, according to an embodiment. For example, browser input expander module 112 can monitor, among other things, how often a browser extension is used, specific times of day a browser extension is used, or when the browser extension is accessed via navigation component 106. All of the information monitored by browser input expander module 112 is stored in query log 114, according to an embodiment.

Browser input expander module 112 monitors the frequency of browser extension usage to determine which browser extensions are among the most popular to the user. For example, browser input expander module 112 may determine that the social networking application discussed above is among one of the user's favorite browser extensions if the user executes the browser extension every few hours or once a day. Thus, browser input expander module 112 can maintain a counter of when each browser extension is utilized by the user and use the counter to update information within query log 114.

The time of day, week or month can also be used to determine when a user is most likely to use a particular browser extension, according to an embodiment. In an example, browser input expander module 112 may identify that the user primarily executes certain browser extensions during the morning, while other browser extensions are accessed primarily during the evening. For instance, a user may have a calendar browser extension installed on client computing device 102. If the user regularly uses the calendar browser extension during the morning hours (e.g., for managing and updating schedules), browser input expander module 112 identifies such usage and stores it in query log 114.

Browser input expander module 112 is also configured to monitor when and how a browser extension is accessed via the navigation component 106. Thus, when a user provides a first input to navigation component 106 and subsequently executes a browser extension, browser input expander module 112 monitors and identifies characteristics of the input. For example, browser input expander module 112 can monitor the input to navigation component 106 to determine which words or phrases are commonly used with a browser extension. These words or phrases are then associated with the browser extension in query log 114.

Browser input expander module 112 is configured to monitor the first input entered into navigation component 106 in order to generate criteria for a model, according to an embodiment. As discussed previously, a first input type can be identified as a keyword trigger or a regular expression trigger. According to an embodiment, repositories can be generated based on the first input type. For example, a keyword repository and a regular expression repository can be generated. The keyword repository can include all browser extensions that are associated with keyword triggers. A regular expression repository can include all browser extensions that are frequently executed with a regular expression trigger. Thus, browser input expander module 112 can monitor the usage of the navigation component 106 to associate the browser extensions with keywords or regular expressions and group the browser extensions accordingly.

Based on the examples discussed above, browser input expander module 112 can generate repositories such as a frequently used repository, a morning repository, an evening repository, or a commonly used terms repository. Browser extensions can be grouped based on these repositories. According to an embodiment, a browser extension can be included in a plurality of repositories. For example, if usage of a browser extension occurs every day during the morning hours and is associated with a user inputting similar phrases in navigation component 106, then said browser extension can be included in the frequently used repository, morning repository and the commonly used terms repository discussed above.

Additional types of browser repositories can include, among other things, an entertainment repository, a task repository, a sharing repository, or security-authenticating repositories. For example, an entertainment repository can include browser extensions related to entertainment, such as the social networking application discussed above. A task repository can include browser extensions used by a user to manage activities or schedules, such as a calendar browser extension or a notes browser extension. A sharing repository can include browser extensions that are used to share information with other users. For example, such browser extensions can enable functionality such as posting information to a third party website or sending an email or instant message to another user. A security-authenticating repository can include browser extensions associated with websites that require a user-name or password for access. The social networking application discussed above is an example of a browser extension that can be included in the security-authenticating repository. In order to post information to a profile on social networking website, a user has to be granted permission to the website by submitting a correct username/password combination.

Query log 114 can include a plurality of combinations of the data discussed above, according to an embodiment. Each combination may include a triplet of data (u, f, r), where "u" refers to user information, "f" refers to the first input provided by the user and "r" refers to the repository from which browser extension results were provided in response to first input f. For example, query log 114 may include triplets of data (u, f, r), where u refers to a user's desire to utilize a repository r, when the user provided first input f. In such an example, the user's intent to use a browser extension can be measured by determining whether the user selected and executed a browser extension from the repository.

The triplets of data are used as criteria by browser input expansion module 112 in order to generate a model. As will be described in more detail below, the output of the model may be used to determine whether to search a repository, whether to include a browser extension from a repository in a set of browser extension results, and/or how the set of browser extension results are displayed within the navigation component 106.

During the generation of a model, a standard machine learning or statistical technique may be used to determine a confidence score or the probability that user u intends to a use a browser extension from repository r when user u provides first input f:

P(intent|u, f, show_r), where "show_r" indicates that browser extensions from repository r are displayed. Any of several well-known techniques may be used to generate the model, such as logic regression, boosted decision trees, random forests, support vector machines, and winnow learners. The model generates a probability that a user intends to use a browser extension in the form of a confidence score, according to an embodiment. For example, the algorithm, "P(intent|u, f, show_r)", can be used to generate different confidence scores for each browser extension within the plurality of repositories. The algorithm can assign confidence score values in the range of 0.0 to 1.0, for example, where 1.0 indicates a 100% probability that a user intends to use a browser extension. A browser extension can be assigned a confidence score of 1.0, when it is known that the browser extension is definitely desired by the user. Such a scenario can occur when the user enters a predetermined keyword trigger that is only associated with one browser extension, for example. The assignment of a confidence score may be based on prior user usage, as described above. For example, frequency of use can be assigned a weighted value, which is factored into calculation of a confidence score. Thus, the more often a browser extension is used, the higher the assigned confidence score will be. The confidence score assigned to a browser extension can be a dynamic or static value. For example, the confidence score may change based on a change in use of a browser extension. Alternatively, a developer or a user may assign a confidence score which remains unchanged. For example, a developer or a user may always want a browser extension to appear within a set of browser extension results. By setting such a requirement for a browser extension, the associated browser extension may be assigned a high confidence score, which will not be affected by user activity.

In an embodiment, browser input expander module 112 performs a search on each of the repositories based on the first input entered by a user. In response, browser input expander module 112 retrieves browser extensions and generates a set of browser extension results for display within navigation component 106. As discussed above, browser extension results are a suggested list of browser extensions that the user may intend on executing. According to an embodiment, browser input expander module 112 can determine how the browser extension results are displayed based on the model. For example, information relating to the user, the first input provided by the user, and each of the repositories may be used as inputs to the model. The model may be applied to each repository and the confidence score output by the model can be used to determine whether to provide browser extension results associated with a specific repository. It can be determined, for example, that browser extension results from two repositories with the highest associated confidence score should be displayed, according to an embodiment. In another embodiment, it may be determined that browser extension results from some repositories should always be provided while browser extension results from other repositories should only be provided if the associated confidence score satisfies a predefined threshold. One of skill in the art will understand that other rules for providing browser extension results from a particular repository may be used. For example, it may be determined that browser extension results from repositories with associated confidence scores above a certain threshold should be retrieved, and if none of the scores are above the threshold then browser extension results from the repository with the highest associated confidence score are retrieved.

According to an embodiment, navigation component 106 is configured to receive a second input. The second input indicates a user's selection of a browser extension included in the set of browser extension results. For example, in response to receiving a set of browser extension results, a user may select one of the suggested browser extensions. In response to receipt of the second input, browser input expander module 112 is configured to execute an operation of the selected browser extension. For example, if a user selects the social networking browser extension discussed above, an executable of the browser extension is launched.

In an embodiment, an authentication request is received from a server hosting an external website or program. For example, when a browser extension is selected, in order to pass contents of the first input or browser to an external website, the user's information must be authenticated. Authentication provides a level of security in order to verify that the user has permission to update or send contents to the external website. Upon receipt of the authentication request, browser input expander module 112 sends user information to the website. For example, browser input expander module 112 can send user information such as, but not limited to user name information, password information, or information related to the client computing device 102. According to an embodiment, authenticating establishes a communication channel between the selected browser extension and the external website or program. For example, a communication channel can be established between client computing device 102 and one of web servers 110-1, 110-2 . . . 110-N hosting the external application. The communication channel enables the exchange of information from the selected browser extension and the web server 110-1, 110-2 . . . 110-N hosting the external website or program. According to an embodiment, the communication channel is a bidirectional communication channel. A bidirectional communication channel, such as a websocket, may be a full-duplex communication channel between client computing device 102 and web servers 110-1, 110-2 . . . 110-N that operates through a single socket on network 108. In an exemplary embodiment, browser 104 implements an HTML5 protocol and includes support for a bidirectional communication protocol, such as the WebSocket protocol.

The first input or content displayed by the browser can be passed to the external website or program, according to an embodiment. For example, upon selecting a browser extension from the displayed browser extension results, the first input entered into navigation component 106 can be passed to the browser extension, which will send the information to the associated external website or program over the established communication channel. In another embodiment, the contents displayed by browser 104 can be sent to the external website or program. For example, a user may select a browser extension which enables the sharing of contents from a website or the URL associated with the website to another user. Thus, any content currently displayed by the browser 104 when a user utilizes system 100 can be shared with another individual via navigation component 106.

Browser 104 may be any kind of browser. Although illustrated separately, browser 104 may also include a browser expander module 112. Browser input expander module 112 may extend the functionality of browser 104 and can be configured to provide a suggested list of browser extensions within navigation component 106. For example, browser input expander module 112 may be a browser extension downloaded from a web server (not shown) and installed on client computing device 102 as part of browser 104. Browser input expander module 112 may be developed by an application developer for use on client computing device 102 or any other computing device. A programming language, such as JavaScript, may be used to develop browser input expander module 112. Browser input expander module 112 may then be stored locally on client computing device 102. Alternatively, browser input expander module 112 may be uploaded to a browser expansion manager server (not shown). Browser expansion manager server may distribute browser input expander module 112 to additional client computing devices due to a request from a user.

Browser input expander module 112, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory, and user interface display.

Network 108 may be any network or combination of networks that can carry data communications. Such a network 108 may include, but is not limited to, a local area network, metropolitan area network, and/or wide area network such as the Internet Network 108 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web servers 110-1, 110-2 ... 110-N are computing devices or applications executing on computing devices that host resource databases 116-1, 116-2 ... 116-N. Each resource database 116-1, 116-2 ... 116-N is associated with a domain name and hosted by one or more web servers 110-1, 110-2 ... 110-N. Web servers 110-1, 110-2 ... 110-N deliver content from resource databases 116-1, 116-2 ... 116-N to browser 104 on client computing device 102. Content included in resource databases 116-1, 116-2 ... 116-N includes any data that that can be provided over network 108. Content within resource databases 116-1, 116-2 ... 116-N is identified by a resource address that is associated with each web server 110-1, 110-2 ... 110-N. Content in resource databases 116-1, 116-2 ... 116-N may include, for example, hypertext markup language (HTML) pages, word processing documents, portable document format (PDF) documents, images, video, and feed sources. Content in resource databases 116-1, 116-2 ... 116-N can include content, such as words, phrases, images and sounds that has embedded information (such as meta-information in hyperlinks) and/or embedded instructions (such as JavaScript scripts).

Client computing device 102 is a processor-based electronic device that is manipulated by a user and is capable of requesting and receiving data from web servers 110-1, 110-2 ... 110-N over network 108. Examples of client computing device 102 include personal computers, mobile communication devices and tablet computers. Client computing device 102 typically includes an application, such as browser 104. A user may utilize browser 104 to request data from web-servers 110-1, 110-2 ... 110-N, such as web-page contents over network 108. For example, a request for data from web servers 110-1, 110-2 ... 110-N may be sent by browser 104 of client computing device 102 in response to a URL request from a user. In response to the request, web servers 110-1, 110-2 ... 110-N deliver data within resource databases 116-1, 116-2 ... 116-N to client computing device 102. When client computing device 102 receives data from web servers 110-1, 110-2 ... 110-N, client computing device 102 uses browser 104 to display the data to the user.

In an embodiment, each of the constituent parts of browser notifications system 100 may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium storage embodiments may include any physical medium which is capable of having instructions encoded thereon that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible storage medium that can serve in the role of providing instructions to one or more processors may be used to store the instructions in these embodiments.

Figure 2:
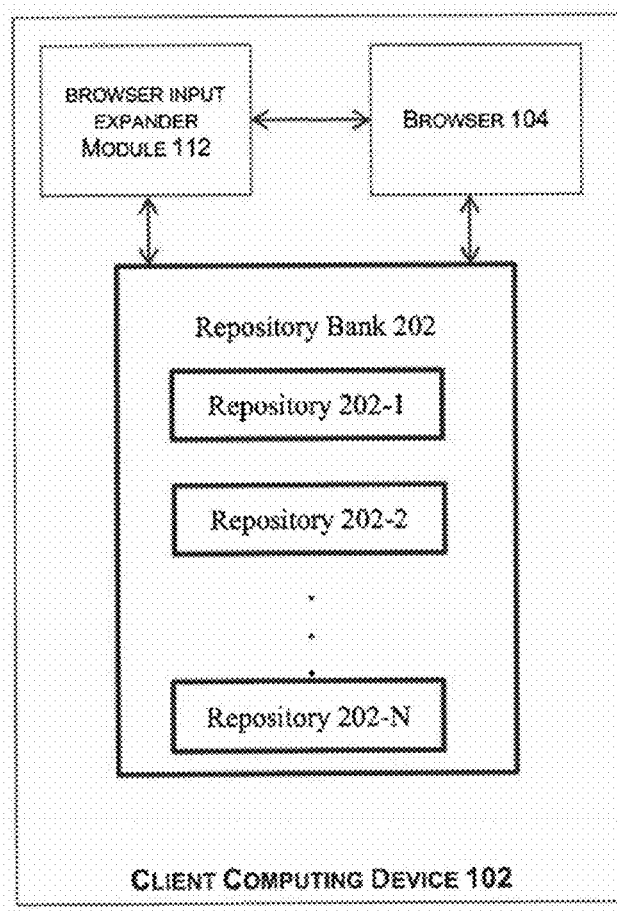
FIG. 2 is an illustration of a client computing device, according to an embodiment.
Figure 3:
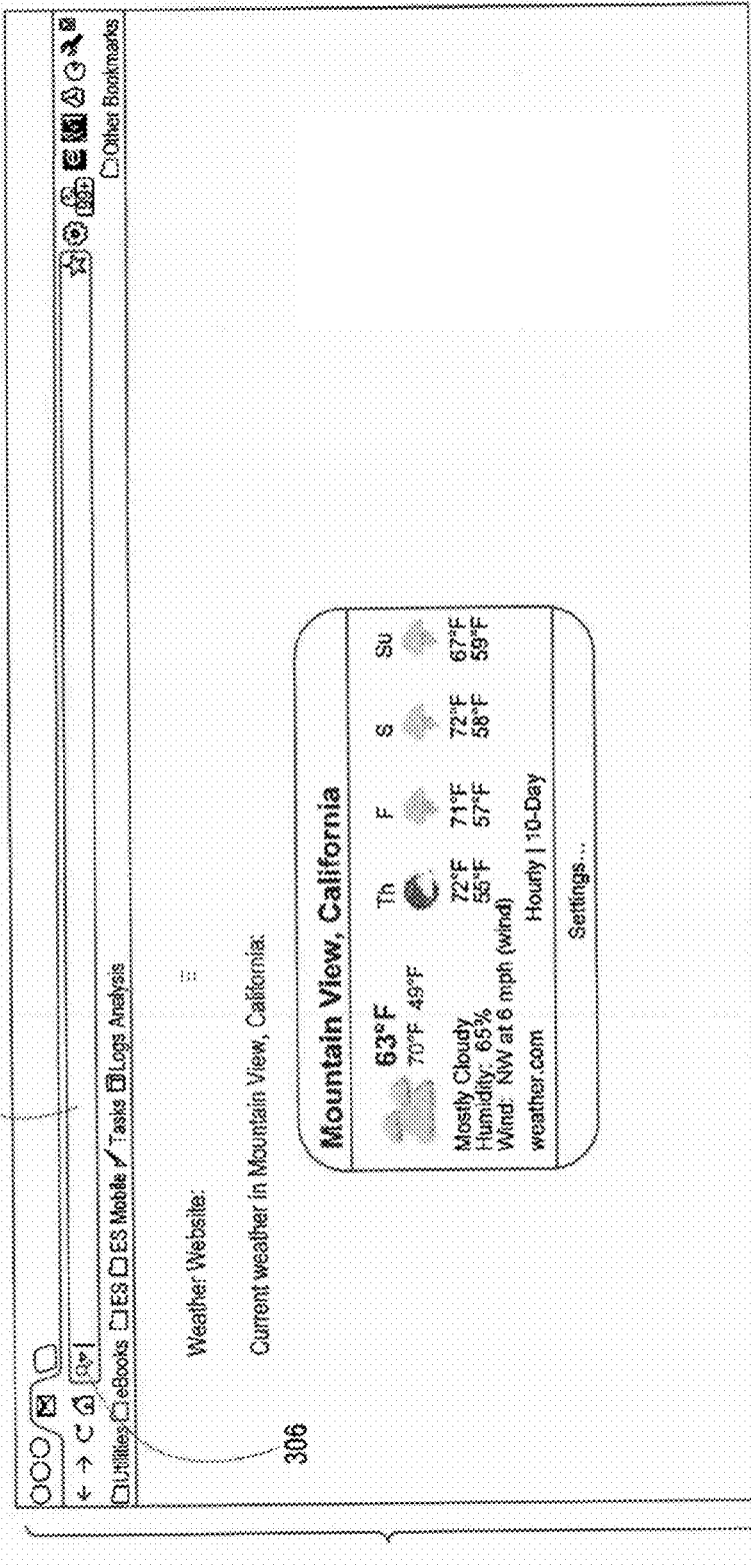
FIG. 3 is an illustration of an example display view of a system, according to embodiment.
Figure 4:
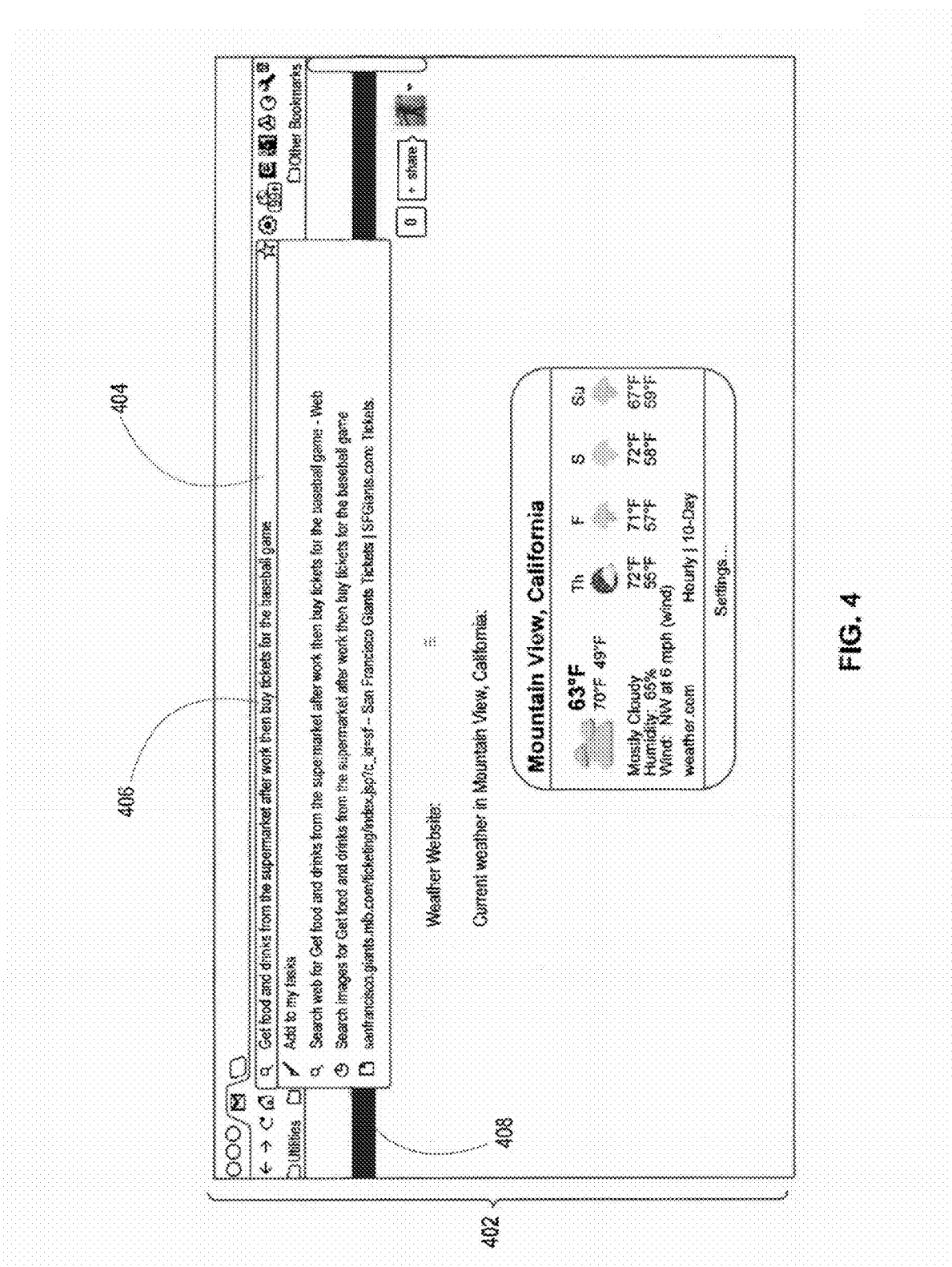
FIG. 4 is another illustration of an example display view of a system, according to embodiment.

FIG. 2 is an illustration of client computing device 102, according to an embodiment. Client computing device 102 includes browser 104, browser input expander module 112, and repository bank 202. Repository bank 202 includes a plurality of repositories 202-1, 202-2 ... 202-N, N being a positive integer. FIG. 2 will be discussed in relation to FIG. 3 and FIG. 4 in order to illustrate certain embodiments. FIG. 3 and FIG. 4 are screen shots of an example system, according to embodiments.

Repository bank 202 may be any temporary and/or permanent storage location associated with browser 104 such as but not limited to a relational database. Repository bank 202 may include a plurality of repositories 202-1, 202-2 ... 202-N. Each repository 202-1, 202-2 ... 202-N can include one or more browser extensions which share common characteristics. As discussed previously, a repository 202-1, 202-2 . . . 202-N may be generated by browser input expander module 112. Browser input expander module 112 may retrieve certain criteria related to the user activity of the browser extensions and input the criteria into a model. The model can group browser extensions based on shared features. In an example, repository 202-1 may be a frequently used repository, while repository 202-2 may be a keyword trigger repository. A frequently used repository can include all browser extensions that are used by a user above a certain threshold. For example, if a user executes a browser extension more than 3 times in a day, that particular browser extension may be included in repository 202-1 along with other browser extensions that were utilized with at least the same frequency.

A keyword trigger repository may include all browser extensions installed on client computing device 102 which are associated with a keyword. Thus, any browser extensions that may be launched by a user entering a particular set of characters may be included in repository 202-2. In this way, when a user enters a first input within a navigation field of browser 104, browser extensions may be retrieved from any of the plurality of repositories 202-1, 202-2 . . . 202-N of repository bank 202 based on the first input. The browser extensions are displayed to the user as a list of suggested browser extensions. FIG. 3 and FIG. 4 illustrate how a user may interact with a browser in order to retrieve browser extensions from repository bank 202, according to embodiments.

FIG. 3 is a screen shot of a display view of an example system, according to an embodiment. FIG. 3 illustrates a browser 302 with a navigation field 304 and a navigation toggle 306. According to an embodiment, navigation field 304 can be used to input different kinds of queries. For example, a user can input a general search query or a URL request into navigation field 304. In response, contents of a website or search results can be displayed by browser 302. In addition to a general search query or a URL request, a user can input a keyword trigger or a regular expression trigger into navigation field 304. A keyword trigger or a regular expression trigger is used to launch a browser extension from repository bank 202, according to an embodiment. For example, a developer of a browser extension may assign a keyword to the browser extension. When a user inputs the keyword within navigation field 304, the browser extension can be retrieved from one of the plurality of repositories 202-1, 202-2 . . . 202-N. The user input is an indication that any text entered into the navigation field 304 will be passed to the browser extension, once the user completes entry of the input.

Navigation toggle 306 can be configured to change the functionality of navigation field 304, according to an embodiment. Any browser extensions installed on the computing device running browser 302 can be linked to navigation toggle 306. For example, each browser extension can have an icon associated with it. When a user selects navigation toggle 306, a drop down menu of browser extensions can be presented displaying each browser extension icon. A user may select one of the browser extension icons. In response, the associated browser extension is launched as a background process and browser 302 is configured to pass any information within navigation field 304 to the selected browser extension.

FIG. 4 is another screen shot of an example system according to an embodiment. FIG. 4 illustrates a browser 402 in which a user has entered a first input 406 into navigation field 404. As a user enters first input 406, browser 402 is configured to determine whether the first input 406 is related to search query or URL request. For example, first input 406 is not related to a search query or URL request if it does not include any text that is normally associated with a URL request, such as a domain protocol or a website or server name. If the first input 406 is not a search query or URL request, browser 402 is configured to determine a query type of first input 406. In this example, first input 406 is a regular expression trigger. Browser 402 is configured to determine that first input 406 is a regular expression trigger by looking at characteristics of first input 406, such as, but not limited to, the length of the first input 406, the words included in the first input 406, and prior user activity, as discussed previously.

In response to determining that first input 406 is a regular expression trigger, a set of browser extension results 408 are presented to the user. The set of browser extension results 408 includes a list of browser extensions that a user may intend to use. The set of browser extension results are retrieved from repository bank 202 based on a model, according to an embodiment. A model determines a confidence score associated with a probability that a user desires to a use a browser extension from a repository of the plurality of repositories 202-1, 202-2 . . . 202-N. Based on the model, a confidence score for each extension within the plurality of repositories 202-1, 202-2 . . . 202-N is determined and a set of browser extension results 408 are displayed within navigation field 404. In this example, one of the repositories 202-1, 202-2 . . . 202-N can be a regular expression repository, which includes all browser extensions associated with a regular expression. Based on the model the regular expression repository can be assigned the highest confidence score and browser extensions from the regular expression repository can be presented to the user.

In an example, a user may begin to enter a regular expression trigger as a first input, which results in browser extensions within the regular expression repository being assigned a confidence score in the range of 0.9 to 1.0. The assigned confidence score indicates that there is a 90% to 100% chance that a user intends to use one of the browser extensions within the regular expression repository. The set of browser extension results 408 is populated based on many factors such as the text included in the first input and prior user usage of browser extensions installed on the client computing device 102. These factors are used as criteria for the model and produce a subsequent confidence score for each of the repositories 202-1, 202-2 . . . 202-N. In this example, the first input 406 is text that the user would like to send to a task scheduling browser extension. The task scheduling browser extension is retrieved from one of the repositories 202-1, 202-2 . . . 202-N with the highest confidence score (e.g., regular expression repository). The task scheduling browser extension is then presented to the user with the label "Add to my tasks". A user may select the displayed label and in response first input 406 is sent to the task scheduling browser extension. The task scheduling browser extension then passes the first input 406 to an external website or application. In this way, a user may update items such as a web-based calendar via navigation field 404, without having to navigate to the website of the web-based calendar.

Overview of the Method

Figure 5:
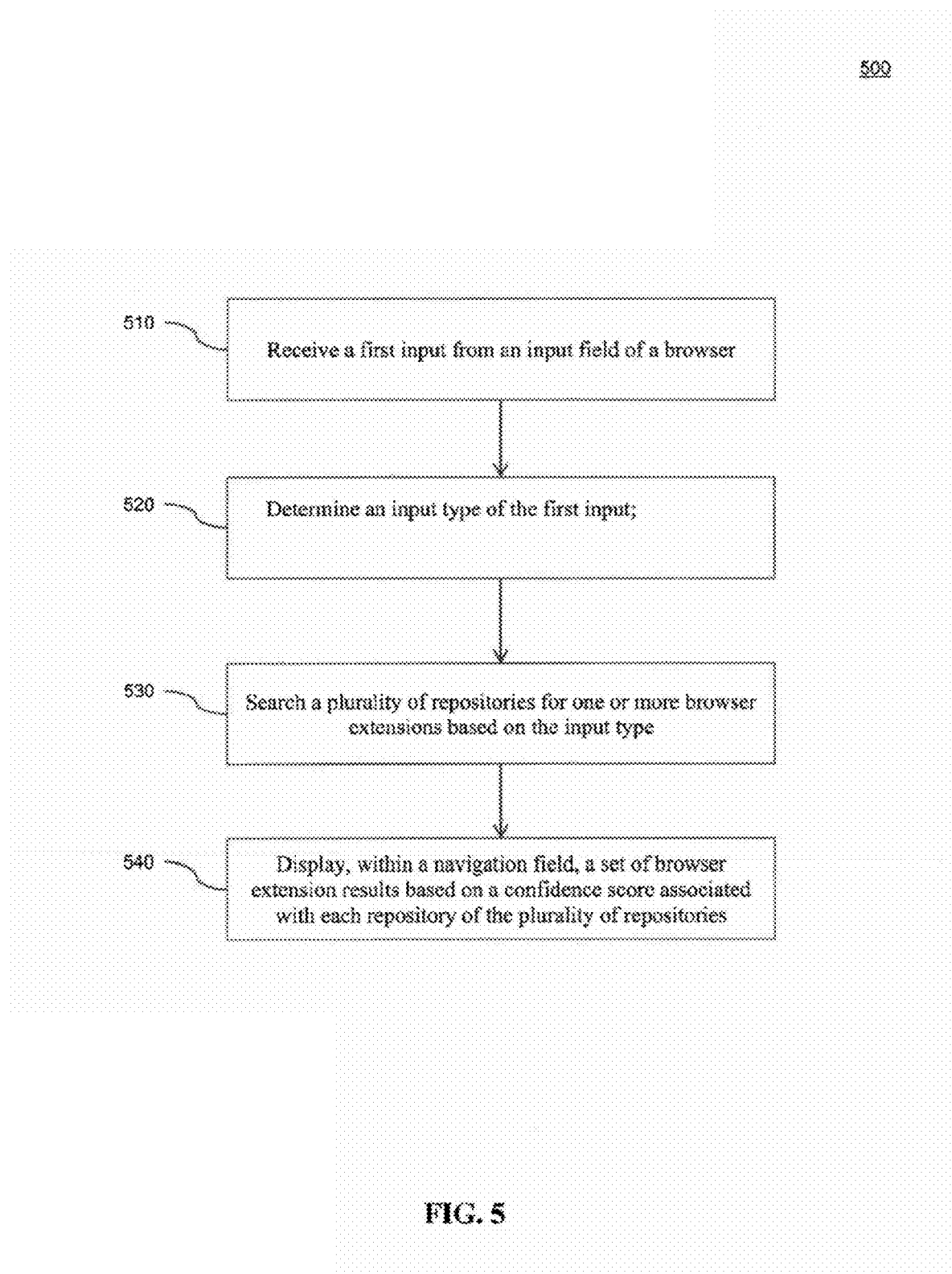
FIG. 5 is a flow diagram of an example method of operation, according to embodiment.

FIG. 5 is a flow diagram of an example method of operation for expending the functionality of the navigation field of a browser, according to embodiment.

In stage 510, a first input from a navigation field of a browser is received. For example, a first input is received from navigation component 106 of browser 104 on client computing device 102. The first input received may be received in response to a user entering a string of characters in the navigation component 106.

In stage 520, an input type of the first input is determined. For example, an input type of the first input is determined by browser input expander module 112 of browser 104. While a user is entering a first input into the navigation field, the first input is parsed and a determination is made whether the first input is related to a search query. A search query is an entry by a user with the purpose of generating a URL request or performing a web search of the first input. Browser input expander module 112 determines whether the first input is related to a search query by analyzing the first input and comparing it to known search query characteristics. For example, if the parsed first input includes a domain protocol or a server name, this is an indication that the first input type is a search query. When the parsed first input is determined not to be related to a search query, browser input expander module 112 is configured to identify a query type of the first input, according to an embodiment. In an embodiment, a query type of the first input is one of a keyword trigger or a regular expression trigger. A keyword trigger is a string of characters that have been assigned to a particular browser extension. A regular expression trigger is a string of characters or a series of words that have been associated with a particular browser extension based on prior user activity. When a user enters a first input not related to a search query, the first input can be compared against preconfigured keyword triggers or a log of previous regular expression entries in order to find a match, according to an embodiment.

In stage 530, a plurality of repositories are searched for one or more browser extensions based on the input type. For example, a plurality of repositories can be searched by browser input expander module 112 of browser 104. As discussed previously, a repository is a collection of browser extensions that are grouped together based on similarities between the browser extensions. For example, repositories of browser extensions can be grouped based on, among other things, the category of the browser extension, frequency of use by a user, or how a user utilizes the browser extensions. Once the input type of the first input is determined in stage 520, the input type along with other information may be used to search a plurality of repositories for one or more browser extensions. Other information that may be used in the search includes, among other things, (i) information related to user activity of the browser extensions, (ii) information related to the first input, and (iii) information related to the plurality of repositories. All of this information, along with the input type, is used as criteria for a model. Once the criteria are passed to the model, a confidence score is generated for each of the repositories.

The confidence score indicates the probability that a user desires to use a browser extension included in the repository. For example, the repository with the highest confidence score is the repository that includes browser extensions that the user has a high probability of using based on the first input entered. In an example, a probabilistic algorithm, such as "P(intent|u, f, show_r)", can be used to generate different confidence scores for each browser extension within the plurality of repositories, where "show_r" indicates that browser extensions from repository r are displayed in response to user activity "u" and first input "1". The algorithm can assign confidence score values in the range of 0.0 to 1.0, where 0.0 indicates a 0% probability that a user intends to user a browser extension and 1.0 indicates a 100% probability that a user intends to use a browser extension. The assignment of confidence scores for browser extensions can be based on, but not limited to, user activity of the browser extensions and characteristics of the first input. Thus, the manner in which a user interacts with a browser extension along with the input type of the first input are used in determining confidence scores. For example, these factors can be used within a decision tree which will determine the confidence score associated with a browser extension. Since generation of a confidence score is associated with user activity, the confidence score associated with a browser extension can change as use of the browser extension or other dependencies change. For example, a user may utilize one or more browser extensions primarily during the morning hours. Thus, on any given day, the one or more browser extensions can be assigned a higher confidence score (e.g. 0.9 to 1.0) in the morning and assigned a lower confidence at all other times of day (e.g. 0.1 to 0.5).

In stage 540, a set of browser extension results is displayed with the navigation field based on a confidence score associated with each repository of the plurality of repositories. For example, the set of browser extension results can be displayed by browser input expander module 112 of browser 104. Once the plurality of repositories are searched in stage 530, the browser extensions from the repositories with the highest confidence scores are retrieved. The browser extensions are presented to the user as a list of browser extension results, with each browser extension having a label indicating a description of the browser extension. In this way a user is provided with a list of suggested browser extensions to use based on the first input that was entered. A user may subsequently choose to select one of the browser extensions from the browser extension results, which will launch the browser extension. The first input may then be passed to the browser extension to perform any of a number of actions intended by the user, such as updating a web-based calendar. Alternatively, upon selection of a browser extension, a user may share a currently viewed URL or its contents with another user.

Computer System

Figure 6:
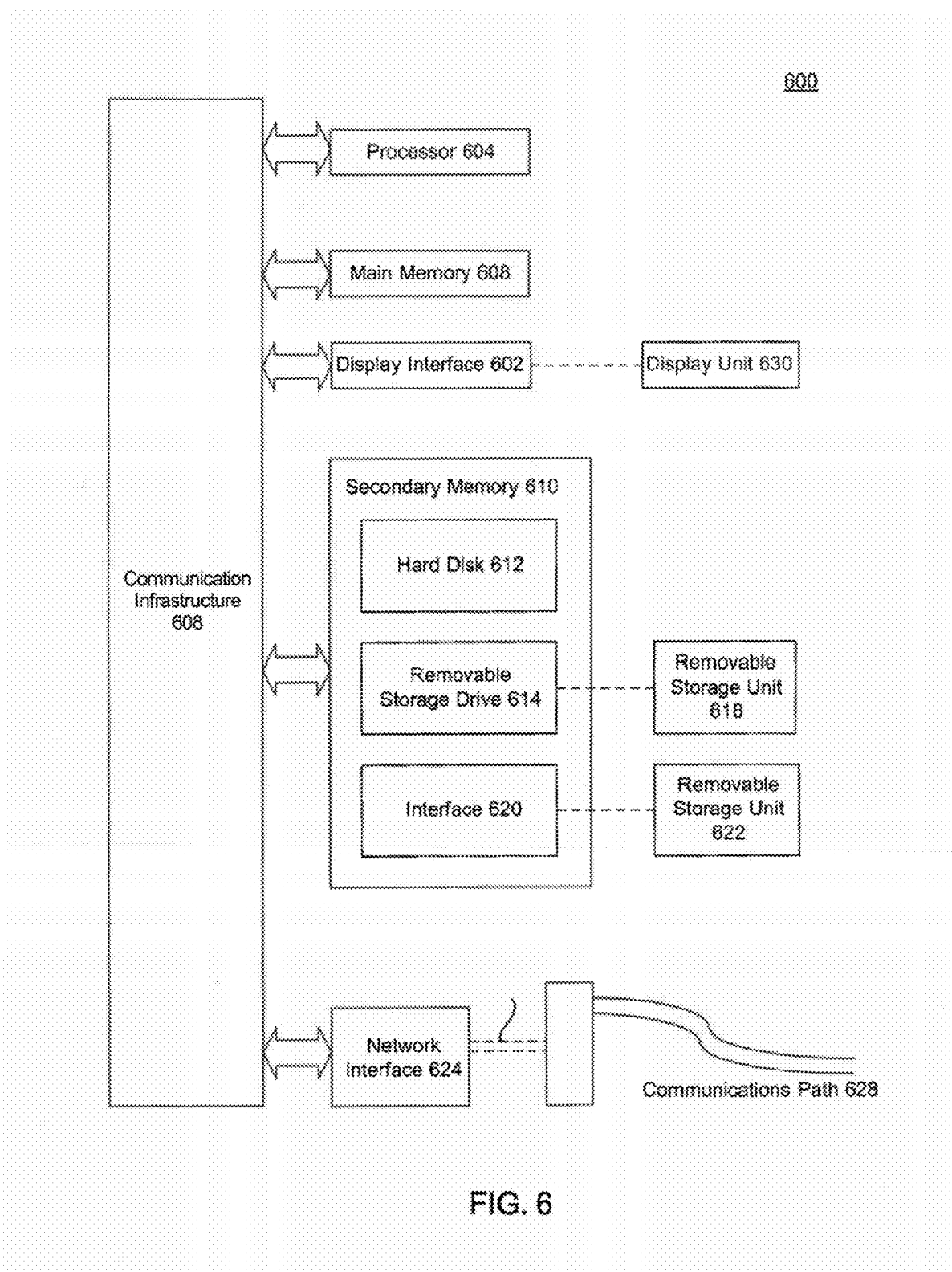
FIG. 6 is a diagram of an example system that may be used to implement embodiments disclosed herein.

Various aspects of the present invention can be implemented by software, firmware, hardware, or a combination thereof. FIG. 6 illustrates an example computer system 600 in which the embodiments, or portions thereof, can be implemented as computer-readable code. For example, browser notification system 100 carrying out method 500 of FIG. 5 can be implemented in system 600. Various embodiments of the invention are described in terms of this example computer system 600.

Computer system 600 includes one or more processors, such as processor 604. Processor 504 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive and/or a removable storage drive. Removable storage drive 614 may include a floppy disk drive, a magnetic tape drive, an optical disk drive, a flash memory, or the like. The removable storage drive 614 reads from and/or writes to removable storage unit 618 in a well-known manner. Removable storage unit 618 may include a floppy disk, magnetic tape, optical disk, etc. which is read by and written to by removable storage drive 614. As will be appreciated by persons skilled in the relevant art(s), removable storage unit 618 includes a computer readable storage medium having stored therein computer software and/or data.

In alternative implementations, secondary memory 610 may include other similar means for allowing computer programs or other instructions to be loaded into computer system

600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of non-storage signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the term "computer readable storage medium" is used to generally refer to media such as removable storage unit 618, removable storage unit 622, and a hard disk installed in hard disk drive 612. Computer readable storage medium can also refer to one or more memories, such as main memory 608 and secondary memory 610, which can be memory semiconductors (e.g. DRAMs, etc.). These computer program products are means for providing software to computer system 500.

Computer programs (also called computer control logic) are stored in main memory 608 and/or secondary memory 610. Computer programs may also be received via communications interface 624. Such computer programs, when executed, enable computer system 600 to implement the embodiments as discussed herein. In particular, the computer programs, when executed, enable processor 604 to implement the processes of embodiments of the present invention, such as the steps in the methods discussed above. Accordingly, such computer programs represent controllers of the computer system 600. Where embodiments are implemented using software, the software may be stored in a computer program product and loaded into computer system 600 using removable storage drive 614, interface 620, or hard drive 612.

Embodiments may be directed to computer products comprising software stored on any computer readable storage medium. Such software, when executed in one or more data processing devices, causes a data processing device(s) to operate as described herein.

CONCLUSION

The Summary and Abstract sections may set forth one or more but not all example embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A computer-implemented method, comprising:
   receiving, at a client device, a first input from a navigation field of a browser;
   determining, at the client device, an input type of the first input;
   retrieving, from a plurality of repositories, different browser extensions, wherein the browser extensions are retrieved based on (i) a comparison of the input type with categories assigned to each of the repositories, and (ii) prior usage of the browser extensions;
   providing, within the navigation field, a list of the retrieved browser extensions based on a confidence score associated with each repository of the plurality of repositories, wherein the confidence score indicates a probability of a user's intent to use the retrieved browser extensions; and
   based on a selection of one of the retrieved browser extensions within the navigation field, such that an executable of the selected browser extension is launched in response, and the selected browser extension utilizes the first input to update an online resource associated with the selected browser extension, wherein the update occurs prior to a user navigation to the online remote resource.

2. The method of claim 1, further comprising:
   generating criteria for a model based on a combination of (i) information related to user activity of the one or more browser extensions, (ii) information related to the first input, and (iii) information related to the plurality of repositories, wherein the model assigns the confidence score for each repository of the plurality of repositories;
   selecting one or more of the repositories based on the confidence score; and
   retrieving information for display from the browser extensions stored in the selected one or more repositories based on the first input.

3. The method of claim 1, further comprising:
   receiving, at the client device a second input, wherein the second input indicates the selection of the retrieved browser extension; and
   executing, at the client device, an operation of the selected browser extension.

4. The method of claim 3, further comprising:
   receiving, at the client device, an authentication request from a server hosting an external application;
   authenticating, at the client device, the selected browser extension, wherein authenticating establishes a communication channel between the selected browser extension and the external application; and sending, by the client device, the first input or content displayed by the browser to the external application.

5. The method of claim 1, wherein determining an input type comprises:
parsing data associated with the first input;
determining that the parsed data is not related to a search query; and
when the parsed data is determined not to be related to a search query, identifying a query type of the first input based on characteristics of the first input.

6. The method of claim 5, wherein the query type is a keyword trigger.

7. The method of claim 5, wherein the query type is a regular expression trigger.

8. The method of claim 1, wherein the navigation field is an address field of the browser.

9. The method of claim 1, wherein providing the retrieved browser extensions further comprises:
identifying one or more browser extensions in the plurality of repositories to be displayed; and
displaying a label describing the one or more browser extensions based on the confidence score.

10. The method of claim 1, wherein the retrieving from the plurality of repositories is triggered by a user pressing one or more shortcut keys of an input device before or after entering the first input in the input field.

11. The method of claim 1, wherein the retrieving is triggered when a cursor is located in the input field.

12. The method of claim 1, wherein the retrieving from the plurality of repositories occurs during the receiving of the first input.

13. The method of claim 1, wherein the first input is generated based on a highlight of a URL.

14. A system, comprising:
a computing device comprising a processor and memory;
a user interface module, implemented on the computing device, and configured to receive a first input from a navigation field of a browser; and
a browser input expander module, implemented on the computing device, and configured to:
determine an input type of the first input, retrieve, from a plurality of repositories, different browser extensions based on the input type, wherein the browser extensions retrieved based on (i) a comparison of the input type with categories assigned to each of the repositories, and (ii) prior usage of the browser extensions;
provide, within the navigation field, a list of the retrieved browser extensions based on a confidence score associated with each repository of the plurality of repositories, wherein the confidence score indicates a probability of a user's intent to use the retrieved browser extensions; and
based on a selection of one of the retrieved browser extensions within the navigation field, such that an executable of the selected browser extension is launched in response and the selected browser extension utilizes the first input to update an online resource associated with the selected browser extension, wherein the update occurs prior to a user navigation to the online remote resource.

15. The system of claim 14, wherein the browser input expander module is further configured to:
generate criteria for a model based on a combination of (i) information related to user activity of the one or more browser extensions, (ii) information related to the first input, and (iii) information related to the plurality of repositories, wherein the model assigns the confidence score for each repository of the plurality of repositories, select one or more of the repositories based on the confidence score, and
retrieve information for display from the browser extensions stored in the selected one or more repositories based on the first input.

16. The system of claim 14, wherein the user interface module is further configured to:
receive a second input, wherein the second input indicates the selection of the retrieved browser extension.

17. The system of claim 16, wherein the browser input expander module is further configured to:
receive an authentication request from a server hosting an external application, authenticate the selected browser extension, wherein the authentication enables a communication channel between the selected browser extension and the external application, and
send the first input or content displayed by the browser to the external application.

18. The system of claim 14, wherein the browser input expander module is further configured to:
parse data associated with the first input,
determine that the parsed data is not related to a search query, and
when the parsed data is determined not to be related to a search query, identify a query type of the first input based on characteristics of the first input.

19. The system of claim 18, wherein the query type is a keyword trigger.

20. The system of claim 18, wherein the query type is a regular expression trigger.

21. The system of claim 14, wherein the browser input expander module is further configured to:
identify one or more browser extensions in the plurality of repositories to be displayed, and
display a label describing the one or more browser extensions based on the confidence score.

22. A non-transitory computer-readable storage medium storing instructions executable by one or more computers which, upon execution, cause the one or more computers to perform operations comprising:
receiving a first input from a navigation field of a browser;
determining an input type of the first input;
retrieving, from a plurality of repositories, different browser extensions, wherein the browser extensions are retrieved based on (i) a comparison of the input type with categories assigned to each of the repositories, and (ii) prior usage of the browser extensions;
providing, within the navigation field, a list of the retrieved browser extensions based on a confidence score associated with each repository of the plurality of repositories, wherein the confidence score indicates a probability of a user's intent to use the retrieved browser extensions; and
based on a selection of one of the retrieved browser extensions within the navigation field, such that an executable of the selected browser extension is launched in response and the selected browser extension utilizes the first input to update an online resource associated with the selected browser extension, wherein the update occurs prior to a user navigation to the online remote resource.

23. The non-transitory computer readable storage medium of claim 22, wherein the operations further comprise:
generating criteria for a model based on a combination of (i) information related to user activity of the one or more browser extensions, (ii) information related to the first input, and (iii) information related to the plurality of repositories, wherein the model assigns the confidence score for each repository of the plurality of repositories;

selecting one or more of the repositories based on the confidence score; and retrieving information for display from the browser extensions stored in the selected one or more repositories based on the first input.

24. The non-transitory computer readable storage medium of claim 22, wherein the operations further comprise:

receiving a second input, wherein the second input indicates the selection of the browser extension included in the set of browser extension results; and executing an operation of the selected browser extension.

25. The non-transitory computer readable storage medium of claim 24, wherein the operations further comprise:

receiving an authentication request from a server hosting an external application;

authenticating the selected browser extension, wherein authenticating enables a communication channel between the selected browser extension and the external application; and sending the first input or content displayed by the browser to the external application.

26. The non-transitory computer readable storage medium of claim 24, wherein the operations further comprise:

identifying one or more browser extensions in the plurality of repositories to be displayed; and displaying a label describing the one or more browser extensions based on the confidence score.

27. The non-transitory computer readable storage medium of claim 22, wherein the operations further comprise:

parsing data associated with the first input;

determining that the parsed data is not related to a search query; and when the parsed data is determined not to be related to a search query, identifying a query type of the first input based on characteristics of the first input.

28. The non-transitory computer readable storage medium of claim 27, wherein the query type is a keyword trigger.

29. The non-transitory computer readable storage medium of claim 27, wherein the query type is a regular expression trigger.

* * * * *